(12) United States Patent
Suto

(10) Patent No.: US 6,266,101 B1
(45) Date of Patent: *Jul. 24, 2001

(54) Y/C SEPARATOR

(75) Inventor: Nobuji Suto, Sakaimachi (JP)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,417

(22) Filed: Oct. 30, 1997

(30) Foreign Application Priority Data

Oct. 31, 1996 (JP) .................................................. 8-307462

(51) Int. Cl.[7] ............................ H04N 5/228; H04N 9/68; H04N 7/01; H04N 9/77
(52) U.S. Cl. ............................ 348/663; 348/663; 348/234; 348/222; 348/450
(58) Field of Search .................................... 348/663, 222, 348/234, 239, 272, 273, 279, 450, 712, 713, 645, 649, 679, 256, 235; H04N 9/77, 9/78

(56) References Cited

U.S. PATENT DOCUMENTS

| 4,903,122 | * | 2/1990 | Ozaki et al. | 358/48 |
|---|---|---|---|---|
| 5,018,006 | * | 5/1991 | Hashimoto | 358/44 |
| 5,047,840 | * | 9/1991 | Miki | 358/31 |
| 5,063,439 | * | 11/1991 | Tabei | 358/41 |
| 5,223,920 | * | 6/1993 | Srivastava | 358/21 |
| 5,374,955 | * | 12/1994 | Furuhata et al. | 348/264 |
| 5,663,759 | * | 9/1997 | Horng | 348/222 |
| 5,671,013 | * | 9/1997 | Nakao | 348/234 |
| 5,729,299 | * | 3/1998 | Suzuki et al. | 348/649 |
| 5,748,260 | * | 5/1998 | Hatano | 348/663 |
| 5,754,245 | * | 5/1998 | Yoshida | 348/451 |
| 5,831,673 | * | 11/1998 | Przyborski et al. | 348/239 |
| 5,966,170 | * | 10/1999 | Sugiura et al. | 348/234 |

* cited by examiner

Primary Examiner—Reinhard J. Eisenzopf
Assistant Examiner—Paulos Natnael
(74) Attorney, Agent, or Firm—Edward W. Goodman

(57) ABSTRACT

In a color signal generating circuit, color signals are generated based on an image signal of an odd field of an interlace scanning and the color signals are stored. A luminance signal generating circuit generates a luminance signal based on the image signal of an odd field. An arithmetic circuit generates an interpolation luminance signal based on the color signals previously stored in the color signal generating circuit. A color difference generating circuit generates a color difference signal based on the color signals previously stored in the color generating circuit. Arranged as such, the color signal generating circuit avoids reduced vertical resolution and deviations in the displayed image when progressively scanning image information is generated from interlace scanning image information.

5 Claims, 3 Drawing Sheets

| $Mg_{11c}$ | $G_{12c}$ | $Mg_{13c}$ | $G_{14c}$ |
|---|---|---|---|
| $Ye_{21c}$ | $Cy_{22c}$ | $Ye_{23c}$ | $Cy_{24c}$ |
| $Mg_{31c}$ | $G_{32c}$ | $Mg_{33c}$ | $G_{34c}$ |
|  |  |  |  |

|  |  |  |  |
|---|---|---|---|
| $Y_{21}$ | $Y_{22}$ | $Y_{23}$ | $Y_{24}$ |
| $Y_{41}$ | $Y_{42}$ | $Y_{43}$ | $Y_{44}$ |
|  |  |  |  |

$Y_{22} = G_{12c} + Cy_{22c}$
$\quad\quad = G_{11} + (B_{31} + G_{31})$ $Y_{21} = Mg_{11c} + Ye_{21c}$
$\quad\quad = (R_{11} + B_{11}) + (R_{31} + G_{31})$

FIG. 3b

Y/C SEPARATOR

BACKGROUND OF THE INVENTION

1. Field of the Invention

The invention relates to the field of color image signal processing. In particular, the present invention relates to a Y/C separator which generates a luminance signal and a chrominance (color difference) signal of a sequential scanning system on the basis of an image signal of an interlaced scanning system, and to a camera comprising such a Y/C separator.

2. Description of the Related Art

In case of generating a luminance signal and a color difference signal on the basis of an image signal outputted from an image pick-up device, such as a CCD or the like, a Y/C separation circuit (Y: Luminance signal, and C: Color difference signal) is used. The Y/C separation circuit includes a circuit which simply generates a luminance signal and a color difference signal, and, additionally, for example, a circuit provided with a function which receives an image signal of an interlaced scanning system and generates a luminance signal and a color difference signal of a sequential scanning system. Up to now, conversion from an interlaced scanning system to a sequential scanning system has been realized, for example, by twice repeating the scanning of each of the scanning lines forming an odd field.

There is a possibility that a moving image will be displayed in a distorted state when displaying by simply repeatedly using each scanning line. To display, repeatedly, the same scanning line, means that scanning lines having the same content are disposed in parallel with one another, and this causes deterioration in the resolution in the vertical direction.

SUMMARY OF THE INVENTION

It is an object of the present invention provide a Y/C separator capable of avoiding distortion of an image and deterioration of the resolution in the vertical direction.

The present invention makes substantially all scanning lines different in content from one another without repeating one scanning line. Due to this, distortion of an image and deterioration of the resolution in the vertical direction which have been generated in case of repeating each scanning line, can be avoided.

Those skilled in the art will understand the invention and additional objects and advantages of the invention by studying the description of preferred embodiments below with reference to the following drawings which illustrate the features of the appended claims.

BRIEF DESCRIPTION OF THE DRAWINGS

FIGS. 3a and 3b are second diagram for explaining the operation of a specific embodiment of the invention.

DESCRIPTION OF THE PREFERRED EMBODIMENTS

Figures 1, 2A, 2B:
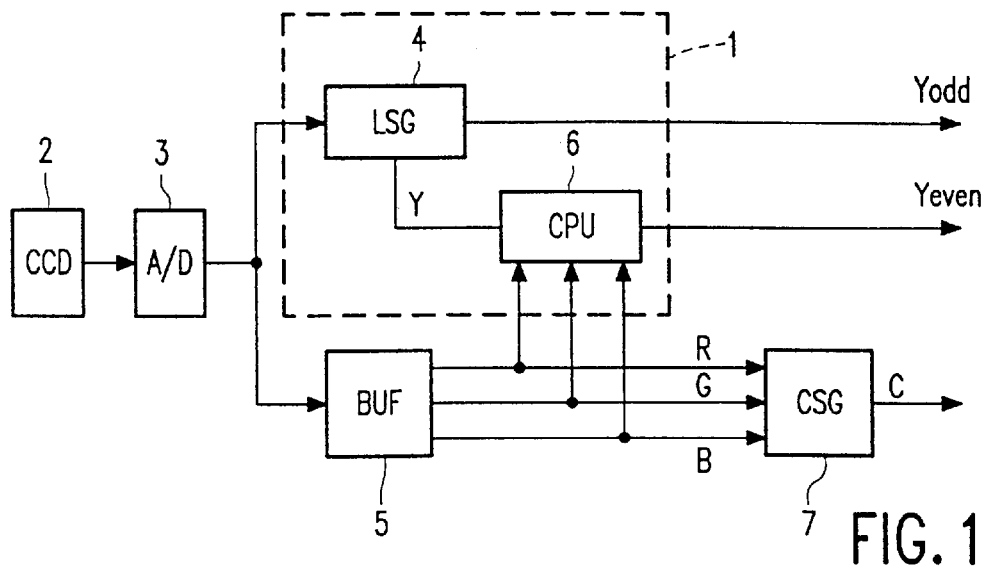
FIG. 1 is a diagram of a camera with a specific embodiment of the of Y/C separator in accordance with the invention.
FIGS. 2a and 2b are first diagrams for explaining the operation of a specific embodiment the invention.

As shown in FIG. 1, a Y/C separation circuit of the invention has an analog-to-digital converter (A/D) 3 linked to a CCD 2 for interlaced scanning, a luminance signal generating circuit (LSG) 4, a color signal generating circuit (buffer; BUF) 5, an arithmetic circuit (CPU) 6, and a color difference signal generating circuit (CSG) 7. The A/D converter 3 is a known circuit composed of a logic device for converting the form of an image signal from an analog form to a digital form. The luminance signal generating circuit 4 is composed of a logic circuit for generating a luminance signal Y on the basis of an image signal. The buffer 5 is a circuit having a logic circuit for performing an arithmetic function which generates color signals R, G and B of red, green and blue on the basis of an image signal, and a memory device for storing the color signals. The arithmetic circuit 6 is a microprocessor which controls the timing for the luminance signal generating circuit 4 to generate a luminance signal Yodd, and the arithmetic circuit 6 generates an interpolation luminance signal Yeven on the basis of color signals R, G and B stored in the buffer 5. The color difference signal generating circuit (CSG) 7 is a known circuit composed of a logic device for generating a color difference signal C on the basis of color signals R, G and B. Here, since both of the luminance signal generating circuit 4 and the arithmetic circuit 6 are related to generation of a luminance signal, both of them are collectively referred to as a luminance signal generating means 1.

FIG. 2a shows an arrangement of color filters of the CCD 2. In case that a scanning operation for making an odd field is started, columns C1, C2, C3, and so forth, of rows R1 and R2, which form a line n, are first read out from the CCD 2, and then columns C1, C2, C3, and so forth, of rows R3 and R4, which form a line n+1, are read out. After this, until all of the image signals forming the odd field are obtained, reading out lines two by two, namely, reading out lines n+2, n+3, and so forth, is continued. The luminance signal generating circuit 4 generates a luminance signal Yodd on the basis of the read-out image signal. On the other hand, the buffer 5 generates color signals R, G and B, and, at the same time, stores these color signals. The color difference signal generating circuit 7 generates a color difference signal C, using these color signals R, G and B.

Here, a case of generating a luminance signal Y and a color difference signal C of an odd field is described in more detail. As shown in FIG. 2b, a luminance signal Y of the line n is represented by Y11, Y12, Y13, etc. These luminance signals are computed by operations in the luminance signal generating circuit 4, namely, operations (Ye+Mg) and (Cy+G). On the other hand, color signals R, G and B of the line n are represented by (R11, G11 and B11), (R12, G12 and B12), and so forth.

As appears from FIG. 2b, image data of two pixels are formed by combining color signals R11, G11 and B11 and luminance signals Y11 and Y12. In the same way, image data of two pixels are formed by combining color signals R12, G12 and B12, and luminance signals Y13 and Y14, or combining color signals R31, G31 and B31, and luminance signals Y31 and Y32. That is to say, image data of two pixels are formed by combining a set of color signals and two luminance signals. The timing when the luminance signal generating circuit 4 outputs a luminance signal Yodd is controlled by the arithmetic circuit 6. The arithmetic circuit 6 controls the output timing of a luminance signal synchronously with the read-out timing of the CCD 2.

In case of an ordinary interlaced scanning, a scanning for making an odd field is performed and then a scanning for making an even field is performed, namely, reading out for forming lines n', n'+1, and so forth, is performed. However, the Y/C separator of the invention generates an interpolation field instead of reading out lines n', n'+1, and so forth.

A process of forming an interpolation field is implemented using color signals generated by the buffer 5 on the basis of image signals of a previously stored odd field. That is, the arithmetic circuit 6 generates a luminance signal Yeven on the basis of color signals R, G, B, generated by the buffer 5. On the other hand, the color difference signal generating circuit 7 generates a color difference signal C on the basis of color signals R, G and B.

In order to generate a luminance signal Yeven of an interpolation field, the invention uses color signals R, G and B (R11, G11, B11, R12, G12, B12, R31, G31, B31, and so forth) as shown in FIG. 2b. That is, the arithmetic circuit 6 generates color signals Cy, Mg, Ye and G on the basis of color signals R, G and B of an odd field stored in the buffer 5. As shown in FIG. 3a, the arithmetic circuit 6 generates color signals Mg11c and G12c on the basis of color signals R11, G11 and B11. In the same way, the arithmetic circuit 6 generates color signals Ye21c and Cy22c on the basis of color signals R31, G31 and B31. After this, in the same way, the arithmetic circuit 6 generates color signals Mg13c and G14c on the basis of color signals R12, G12 and B12, and generates color signals Ye23c and cyan Cy24c on the basis of color signals R32, G32 and B32.

Next, as shown in FIG. 3b, the arithmetic circuit 6 generates luminance signals Y21, Y22, etc., and Y41, Y42, etc., on the basis of color signals Cy, Mg, Ye and G generated in the above-mentioned manner. That is, the arithmetic circuit 6 generates a luminance signal Y21 on the basis of color signals Mg11c and Ye21c, a luminance signal Y22 on the basis of color signals G12c and Cy22c, and a luminance signal Y23 on the basis of color signals Mg13c and Ye23c. In a manner as described above with reference to FIG. 2b, these luminance signals are referred as a luminance signal Yeven at the time of generating image data (used for an interpolation field). That is to say, image data of two pixels are formed by combining color signals R11, G11 and B11, and luminance signals Y21 and Y22. In the same way, image data of two pixels are formed by combining color signals R12, G12 and B12, and luminance signals Y23 and Y24, or combining color signals R31, G31 and B31, and luminance signals Y41 and Y42. That is, image data of two pixels are formed by combining a set of color signals and two luminance signals.

As described above, the invention makes an interpolation field having luminance signals different from luminance signals forming an odd field. Being different in luminance signals means that scanning lines adjacent to each other are different in content from each other.

In case of implementing an image display directly on the basis of color signals without generating color difference signals, it is sufficient to implement an image display by directly using color signals read out from the buffer 5 without doing so through the color difference signal generating circuit 7.

In the Y/C separator of the invention, since luminance signals which form an odd field and luminance signals which form an interpolation field are different from each other, substantially different scanning lines are arranged. Therefore, it is possible to almost double the resolution in the vertical direction in comparison with a case of twice repeating the same scanning line. Fidelity to an image captured by a CCD is improved, and a moving image being distorted on a display screen is avoided.

Figure 4:
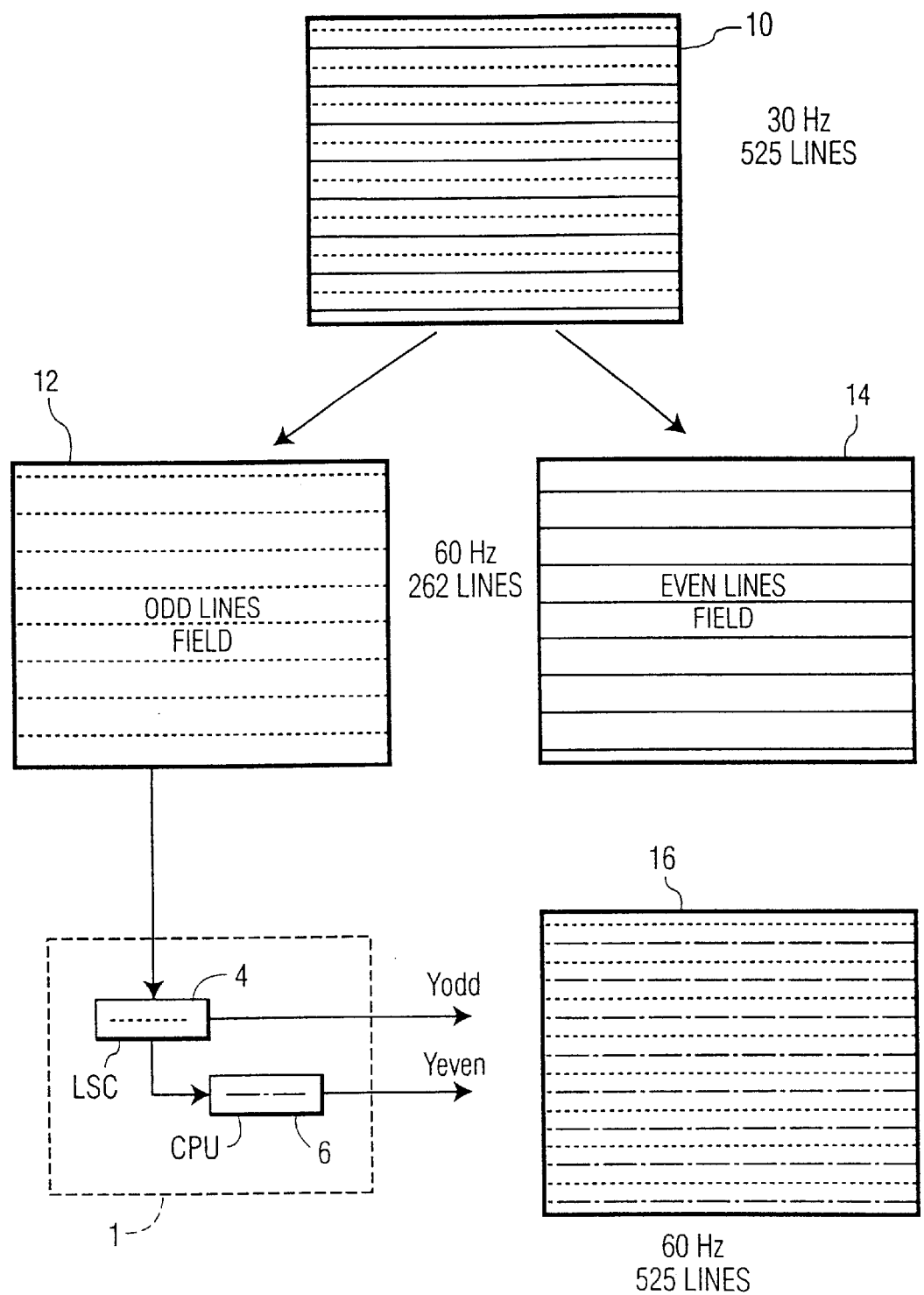
FIG. 4 is a schematic block diagram showing the conversion of an input interlaced signal into an output sequential signal.

FIG. 4 shows, graphically, the conversion of an input interlace scanned signal into an output sequential scanned signal. The input interlace scanned signal, according to the NTSC standard, includes 30 Hz. picture frames 10 each having 525 lines. In transmission, the odd and even lines are separated into separate fields 12 and 14, each containing 262 lines at a field rate of 60 Hz. The, for example, odd lines field 12 is then applied to the luminance signal generator 4 which applies the odd lines to the Yodd output and also to the CPU 6, which generates the Yeven output using interpolation. These outputs form the luminance signal of a frame 16 the output sequential scanned signal having a frame rate of 60 Hz and 525 lines.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the appended claims.

What is claimed is:

1. A Y/C separator for generating a luminance signal and a color difference signal of a sequentially scanned image signal from an interlaced scanned image signal, comprising:

means for generating color signals based on an input image signal of interlaced scanning, and for storing the color signals for a field period of the input image signal;

means for generating a first luminance signal based on the input image signal; and means for generating a color difference signal based on the color signals stored in said color signals generating and storing means;

wherein the luminance signal generating means further comprises:

means for generating an interpolation luminance signal as a second luminance signal to be interposed between lines of said first luminance signal, based on the color signals stored in the color signals generating and storing means.

2. The Y/C separator as claimed in claim 1, in which the luminance signal generating means includes a luminance signal generating circuit for generating the first luminance signal, and the interpolation luminance signal generating means includes a calculating circuit for generating the interpolation luminance signal.

3. The Y/C separator as claimed in claim 1, wherein the input image signal includes separate color signals of Cyan, Magenta, Yellow and Green.

4. A color camera for supplying a luminance signal and a color difference signal of a sequentially scanned image signal, said color camera comprising:

a CCD sensor for furnishing an initial image signal of interlaced scanning;

means for generating color signals based on the initial image signal, and for storing the color signals for a field period of the initial image signal;

means for generating a first luminance signal based on the initial image signal; and means for generating a color difference signal based on the color signals stored in said color signals generating and storing means;

wherein the luminance signal generating means further comprises:

means for generating an interpolation luminance signal for use as a second luminance signal to be interposed between lines of said first luminance signal, based on the color signals stored in the color signals generating and storing means.

5. A method of producing sequentially scanned color image signals comprising the steps:

generating an image signal of interlaced scanning;

generating color signals based on the image signal;

storing the color signals for a field period of the image signal;

generating a first luminance signal based on the image signal;

generating an interpolation luminance signal as a second luminance signal to be interposed between lines of said first luminance signal, based on the stored color signals; and generating a color difference signal for the sequentially scanned color image signals based on the stored color signals.

* * * * *